(12) United States Patent
Alton et al.

(10) Patent No.: US 9,995,933 B2
(45) Date of Patent: Jun. 12, 2018

(54) DISPLAY DEVICES WITH TRANSMITTANCE COMPENSATION MASK

(71) Applicant: MICROSOFT TECHNOLOGY LICENSING, LLC, Redmond, WA (US)

(72) Inventors: Daniel James Alton, Bellevue, WA (US); Nathan Ackerman, Seattle, WA (US); Philip Andrew Frank, Kirkland, WA (US); Andrew Hodge, Palo Alto, CA (US); Barry Corlett, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 14/313,533

(22) Filed: Jun. 24, 2014

(65) Prior Publication Data

US 2015/0370071 A1    Dec. 24, 2015

(51) Int. Cl.
*G09G 5/00* (2006.01)
*G02B 27/01* (2006.01)
(Continued)

(52) U.S. Cl.
CPC ......... *G02B 27/0172* (2013.01); *G02B 5/205* (2013.01); *G02B 27/0093* (2013.01); *G02B 27/0101* (2013.01); *G02F 1/1313* (2013.01); *G02F 1/15* (2013.01); *G02B 2027/014* (2013.01); *G02B 2027/0118* (2013.01); *G02B 2027/0132* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS 6,078,427 A    6/2000  Fontaine et al.
7,639,208 B1   12/2009 Ha et al.
(Continued)

OTHER PUBLICATIONS

Beuret, et al., "Design of an off-Axis See-Through Display based on a Dynamic Phase Correction Approach", In Proceedings of Optics Express, vol. 19, Issue 20, Sep. 23, 2011, 14 pages.
(Continued)

*Primary Examiner* — Amr Awad
*Assistant Examiner* — Donna Lui
(74) *Attorney, Agent, or Firm* — Singh Law, PLLC; Ranjeev Singh

(57) ABSTRACT

A see-through, near-eye mixed reality head mounted display (HMD) device includes left and right see-through display regions within which virtual images are displayable. These left and right see-through display regions each having a transmittance that is less than one hundred percent. The see-through, near-eye mixed reality HMD device also includes a see-through transmittance compensation mask that includes a left window through which the left see-through display region is visible and a right window through which the right see-through display region is visible. In accordance with various embodiments, the see-through transmittance compensation mask is used to provide a substantially uniform transmittance across the field-of-view of a user wearing the HMD device.

6 Claims, 9 Drawing Sheets

(51) Int. Cl.
  *G02B 27/00* (2006.01)
  *G02B 5/20* (2006.01)
  *G02F 1/13* (2006.01)
  *G02F 1/15* (2006.01)

(56) References Cited

U.S. PATENT DOCUMENTS

| | | |
|---|---|---|
| 8,351,123 B2 | 1/2013 | Moussa et al. |
| 8,482,859 B2 | 7/2013 | Border et al. |
| 2007/0177275 A1 | 8/2007 | McGuire, Jr. |
| 2007/0296646 A1* | 12/2007 | Yamamoto ............ G02B 27/017 345/8 |
| 2011/0085127 A1* | 4/2011 | Wada ...................... G02C 7/027 351/45 |
| 2011/0228401 A1* | 9/2011 | Fukushima ............... G02B 1/11 359/609 |
| 2011/0273543 A1* | 11/2011 | Ushio ................. G02B 27/0172 348/54 |
| 2012/0212398 A1 | 8/2012 | Border et al. |
| 2012/0229367 A1 | 9/2012 | Magyari |
| 2013/0114043 A1 | 5/2013 | Balan et al. |
| 2013/0235169 A1* | 9/2013 | Kato ....................... G02B 27/01 348/53 |
| 2013/0257691 A1* | 10/2013 | Saito .................... G02B 27/017 345/8 |
| 2014/0104143 A1* | 4/2014 | Benson ................ G02B 27/017 345/8 |
| 2014/0111864 A1 | 4/2014 | Margulis et al. |
| 2014/0253605 A1* | 9/2014 | Border ............... G02B 27/0172 345/690 |
| 2015/0138224 A1* | 5/2015 | Kim .................... G02B 27/0172 345/592 |
| 2015/0287166 A1* | 10/2015 | Cerny ................ G02B 27/0172 345/423 |

OTHER PUBLICATIONS

International Search Report & Written Opinion dated Sep. 9, 2015, in PCT Application No. PCT/US2015/036856 filed Jun. 22, 2015.
Amendment dated Nov. 9, 2015, in PCT Application No. PCT/US2015/036856 filed Jun. 22, 2015.
Written Opinion dated Dec. 7, 2015, in PCT Application No. PCT/US2015/036856 filed Jun. 22, 2015.
Notification of Transmittal of International Preliminary Report on Patentability dated Mar. 22, 2016, in International Application No. PCT/US2015/036856 filed Jun. 22, 2015.
Response to Written Opinion dated Jan. 22, 2016 in International Application No. PCT/US2015/036856, with amended claims.

\* cited by examiner

DISPLAY DEVICES WITH TRANSMITTANCE COMPENSATION MASK

BACKGROUND

Augmented or mixed reality is a technology that allows virtual imagery to be mixed with a user's actual view of the real world. A see-through, near eye display device may be worn by a user to view the mixed imagery of virtual and real objects. The display device displays virtual imagery within a portion of the user's field-of-view. More specifically, virtual imagery is displayed within a see-through display region of the head mounted display device, which may include left and right see-through display regions for viewing by the left and right eyes of the user. While such a display region is see-through, the display region has optical characteristics, such as a transmittance, that affects (e.g., attenuates) ambient visible light that is incident on the display region. For example, the display region may have a 45 percent transmittance, meaning that only 45 percent of the ambient visible light intensity that is incident on the display region travels through the display region and is incident on the user's eyes. Another way of explaining this is that the display region may cause ambient visible light to be dimmed by 55 percent. If the display region does not occupy the user's entire field-of-view, this can cause a non-uniformity where some regions within the user's field-of-view will be darker than others.

SUMMARY

Certain embodiments described herein relate to see-through, near-eye mixed reality head mounted display (HMD) devices, and methods for use therewith. In accordance with an embodiment, the see-through, near-eye mixed reality HMD device includes left and right see-through display regions within which virtual images are displayable. These left and right see-through display regions each having a transmittance that is less than one hundred percent. The see-through, near-eye mixed reality HMD device also includes a see-through transmittance compensation mask that includes a left window through which the left see-through display region is visible and a right window through which the right see-through display region is visible. In accordance with various embodiments, the see-through transmittance compensation mask is used to provide a substantially uniform transmittance across the field-of-view of a user wearing the HMD device.

In an embodiment, the left see-through display region is located within the left window of the see-through transmittance compensation mask, and the right see-through display region is located within the right window of the see-through transmittance compensation mask, such that outer and inner surfaces of the see-through display regions are, respectively, substantially continuous with outer and inner surfaces of the see-through transmittance compensation mask. In such an embodiment, there should be no or few transmittance mismatches, so long as the transmittances of the see-through display regions and the see-through transmittance compensation mask are the same.

In other embodiments, the display regions are set back relative to (e.g., in a plane behind) the see-through transmittance compensation mask. In certain such embodiments, a left border region of the see-through transmittance compensation mask surrounds the left window and overlaps a portion of the left see-through display region, and a similar right border region surrounds the right window and overlaps a portion of the right see-through display region. In order to make transmittance mismatches less noticeable to a user wearing the near-eye mixed reality HMD device, the left and right border regions each include a gradient pattern that gradually transitions from a first density to a second density, which is less than the first density, as portions of the left and right border regions get closer, respectively, to the left and right windows that they surround. The aforementioned gradient pattern can be a static gradient pattern with static border regions.

In alternative embodiments, a left border region of the see-through transmittance compensation mask includes a plurality of features that are individually selectively activated to adjust boundaries of the left window and thereby adjust a position of the left window. Similarly, a right border region of the see-through transmittance compensation mask includes a plurality of features that collectively are individually selectively activated to adjust boundaries of the right window and thereby adjust a position of the right window. In an embodiment, one or more eye tracking cameras are used to detect locations of left and right eyes of a user wearing the HMD device. A controller selectively activates individual ones of the features of the left and right border regions, in dependence on the detected locations of the left and right eyes of the user wearing the HMD device, to thereby position the left and right windows such that the user's left eye is centered relative to left window and the user's right eye is centered relative to right window. The purpose of centering the left and right eyes, respectively, relative to the left and right windows is to reduce and preferably minimize, from the perspective of the user, non-window portions of the see-through transmittance compensation mask that overlap with one or both of the display regions (which overlapping portions will appear darker to the user), as well as to reduce and preferably minimize gaps between the transmittance compensation mask and one or both of the display regions through which ambient light can leak (which gaps will appear brighter to the user). Each of the selectively activated features of the left and right border regions can have a circular shape, a square shape or a rectangular shape, but are not limited thereto. The features that are selectively activated can comprise, e.g., liquid crystal elements, polymer dispersed liquid crystal elements, or electrochromic elements that are selectively activated by selective application of a voltage. Use of other types of elements are also possible and within the scope of an embodiment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
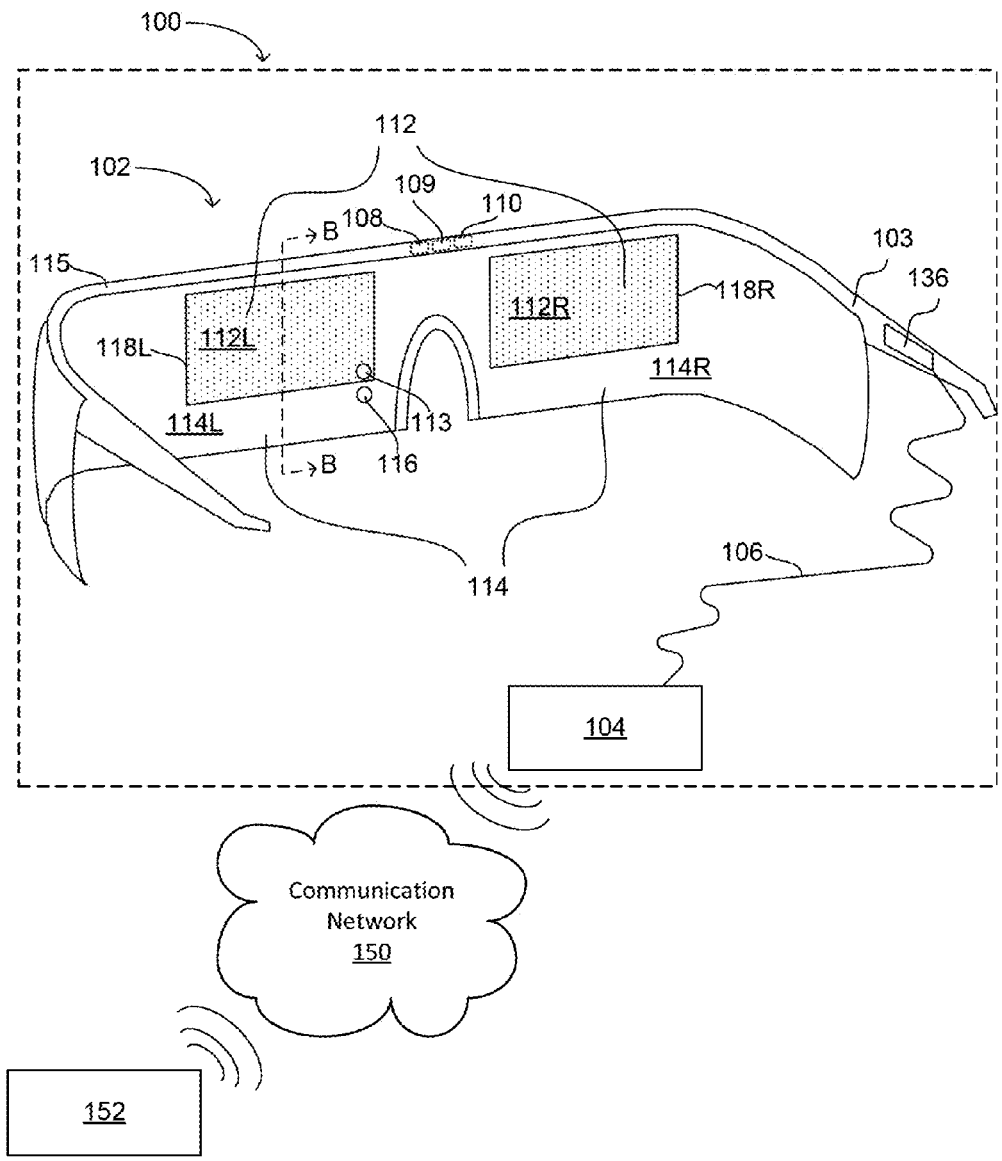
FIG. 1 illustrates an exemplary see-through, near-eye mixed reality head mounted display device system.

Certain embodiments of the present technology relate to see-through, near-eye mixed reality display devices that provide substantially uniform optical characteristics (e.g., transmittances) across the entire field-of-view of a user wearing the device. However, before discussing such embodiments in additional detail, it is first useful to describe an exemplary see-through, mixed reality display device system with which embodiments of the present technology can be used. In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 illustrates example components of a see-through, near-eye mixed reality display device system 100. The system 100 includes a head mounted see-through, near-eye mixed reality head-mounted display device 102, which can also be referred to herein simply as a head mounted display device 102, or even more succinctly as a display device 102. The head mounted display device 102 is shown as being in communication with a processing unit 104 via a wire 106. In other embodiments, the head mounted display device 102 communicates with the processing unit 104 via wireless communication. The processing unit 104 may take various embodiments. For example, the processing unit 104 may be embodied in a mobile device like a smart phone, tablet or laptop computer. In some embodiments, the processing unit 104 is a separate unit which may be worn on the user's body (e.g., on the user's wrist) or kept in a pocket, and includes much of the computing power used to operate the head mounted display device 102. The processing unit 104 may communicate wirelessly (e.g., WiFi, Bluetooth, infrared, RFID transmission, wireless Universal Serial Bus (WUSB), cellular, 3G, 4G or other wireless communication means) over a communication network 150 to one or more hub computing systems 152 whether located nearby in this example or at a remote location. In other embodiments, the functionality of the processing unit 104 may be integrated in software and hardware components of the display device 102.

The head mounted display device 102, which in one embodiment has the shape or form factor of wrap around eyeglasses, is intended to be worn on the head of a user so that the user can see through left and right see-through display regions 112L, 112R, each having a transmittance that is less than 100 percent. More specifically, the left see-through display region 112L is for viewing by the user's left eye, and the right see-through display region 112R is for viewing by the user's right eye. Collectively, the left and right see-through display regions 112L, 112R can be referred to herein as the see-through display region 112. The head mounted display device 102 also includes a see-through transmittance compensation mask 114 having a left window 118L through which the left see-through display region 112L is visible, and having a right window 118R through which the right see through display region 112R is visible. The left and right windows 118L, 118R (which can collectively or individual be referred to as a window 118 or windows 118) can be openings in the see-through transmittance compensation mask 114, and/or can otherwise be portions of the see-through transmittance compensation mask 114 having a higher transmittance than other portions of the mask 114. For example, the see-through transmittance compensation mask 114 can be made of a clear plastic substrate a majority of which is coated with a tinted or mirrored film that provides a desired transmittance (e.g., a 50% transmittance), and the windows 118 can be portions of the clear plastic substrate that are not coated with the tinted or mirrored film, and thus, have a higher transmittance. The windows 118, unless stated otherwise, can be assumed to have a transmittance of 100 percent, however that need not be the case in all embodiments.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, within the see-through display region 112 that are viewable by the person wearing the display device 102 while that person is also viewing real world objects through the see-through display region 112 and through the see-through transmittance compensation mask 114, thereby providing an augmented reality experience. In FIG. 1, the see-through transmittance compensation mask 114 is shown as including left and right see-through transmittance compensation mask sub-regions 114L and 114R at least portions of which are respectively within the field-of-view of the user's left and right eyes. In FIG. 1 the see-through transmittance compensation mask sub-regions 114L and 114R are shown as being connected and continuous with one another, but they can alternatively be separated from one another.

Still referring to FIG. 1, a frame 115 provides a support for holding various elements of the system in place as well as a conduit for electrical connections. In this embodiment, the frame 115 provides a convenient eyeglass frame as support for the elements of the system discussed further below. In other embodiments, other support structures can be used. An example of such a structure is a visor or goggles. Embodiments of the present technology are not limited to the shapes and relative dimensions of the components of the head mounted display device 102 shown in FIG. 1. Rather, components, such as the frame 115, the see-through display region 112 and the see-through transmittance compensation mask 114 can have different shapes and/or dimensions than shown. For example, the see-through display region 112 and the see-through transmittance compensation mask 114 can be curved relative to both vertical and horizontal axes. For another example, the see-through display region 112 may be larger than shown, and the see-through transmittance compensation mask 114 may be smaller than shown.

The frame 115 includes left and right temples or side arms for resting on the user's ears. The temple 103 is representative of an embodiment of the right temple and includes control circuitry 136 for the display device 102. The control circuitry 136 can alternatively be located at a different position or distributed among multiple locations. In FIG. 1, a nose bridge portion of the frame 115 is shown as including an outwardly facing light sensor 108, an outwardly facing camera 109 and an outwardly facing microphone 110. However, one or more of the light sensor 108, the camera 109 and the microphone 110 can be located on other portions of the frame 115. The light sensor 108 can be used, e.g., for detecting ambient light characteristics (e.g., intensity, color content, spectrum, type of illuminant). The camera 109 can be used for capturing video and/or still images, which may include RGB and/or depth images, but is not limited thereto. The microphone 110 can be used for recording sounds and/or accepting voice commands. Data obtained using the light sensor 108, the camera 109 and/or the microphone 110 can be provided to the control circuitry 136 and/or transmitted to the processing unit 104. It is also possible that there are two outwardly facing cameras 109, e.g., one corresponding to a left eye and one corresponding to a right eye.

The outwardly facing light sensor 108 that is located on frame 115 can be used to detect characteristics, such as the intensity, of ambient light that has not yet traveled through the see-through display region 112 or the see-through transmittance compensation mask 114. The head mounted display device 102 can also include additional light sensors to detect characteristics, such as the intensity, of ambient light that traveled through the see-through display region 112 and/or the see-through transmittance compensation mask 114. For example, still referring to FIG. 1, a light sensor 113 can be used to detect characteristics, such as the intensity, of ambient light that traveled through the see-through display region 112. Additionally, or alternatively, a light sensor 116 can be used to detect characteristics, such as the intensity, of ambient light that traveled through the see-through transmittance compensation mask 114. Each of the light sensors 108, 113 and 116 can be designed to be primarily responsive to visible light, e.g., by including optical filters that reflect and/or absorb wavelengths (e.g., infrared wavelengths) outside of the visible spectrum. For example, the light sensor 108, 113 and 116 can be designed to have a photopic response.

The control circuitry 136 provide various electronics that support the other components of head mounted display device 102. Exemplary details of the control circuitry 136 are discussed below with respect to FIG. 9. While not specifically shown in FIG. 1, elements such as ear phones, inertial sensors, a GPS transceiver and/or a temperature sensor can be mounted inside or to the temple 103. In one embodiment, such inertial sensors include a three axis magnetometer, a three axis gyro and a three axis accelerometer. The inertial sensors can be used for sensing position, orientation, and sudden accelerations of head mounted display device 102. From these movements, head position may also be determined. Additionally, while not specifically shown in FIG. 1, the head mounted display device 102 can include one or more eye tracking cameras that can be used to detect the locations of the user's eyes as well as the location of the user's gaze. Some additional details of these sensors and other elements are described below with reference to FIG. 9.

As mentioned above, a user wearing the head mounted display device 102 can view virtual images, and real images, through the see-through display region 112. The user wearing the display device 102 can also view real images through the see-through transmittance compensation mask 114. The virtual images can be generated by one or more micro-display devices (not specifically shown in FIG. 1, but discussed below with reference to FIG. 9) mounted in or to the frame 115, and optical elements such as waveguides, mirrors and/or the like, can be used to transfer or guide the virtual images to the see-through display region 112. Alternatively, left and right see-through micro-displays can be located in or on left and right see-through lenses or some other see-through substrate to provide the see-through display region 112. In other words, one or more micro-display devices located on the frame 115 can generate virtual images that are transferred to the left and right see-through display regions 112L, 112R using one or more waveguides, mirrors and/or the like, or alternatively the virtual images displayed in the left and right see-through display regions 112L, 112R can be generated using see-through displays that are coextensive with the left and right see-through display regions 112L, 112R.

There are different image generation technologies that can be used to implement such see-through displays or micro-display devices. For example, transmissive projection technology can be used, where a light source is modulated by an optically active material and backlit with white light. These technologies are usually implemented using liquid crystal display (LCD) type displays with powerful backlights and high optical energy densities. Alternatively, a reflective technology, in which external light is reflected and modulated by an optically active material, can be used. Digital light processing (DLP), liquid crystal on silicon (LCOS) and Mirasol® display technology from Qualcomm, Inc. are all examples of reflective technologies. Additionally, such see through micro-displays or micro-display devices can be implemented using an emissive technology where light is generated by the display, see for example, a PicoP™ display engine from Microvision, Inc. Another example of emissive display technology is a micro organic light emitting diode (OLED) display. Companies such as eMagin and Microoled provide examples of micro OLED displays.

Regardless of the type of technology used to generate virtual images that are observable within the see-through display region 112, the see-through display region 112 does not take up the entire field-of-view of the user wearing the head mount display device 102. Rather, at least a portion of the see-through transmittance compensation mask 114 will also be within the field-of-view of the user wearing the head mounted display device 102.

As mentioned above, while the display region 112 is see-through, the display region 112 has optical characteristics, such as a transmittance, that affect (e.g., attenuate) ambient visible light that is incident on the display region 112. For an example, the see-through display region 112 may have a 50 percent transmittance for visible light, meaning that only 50 percent of the ambient visible light that is incident on the see-through display region 112 will pass through the see-through display region 112 and be incident on the user's eyes, with the remaining 50 percent of the ambient visible light being reflected and/or absorbed by the see-through display region 112. Another way of explaining this is that the see-through display region 112 may cause ambient visible light to be dimmed by 50 percent. Since the see-through display region 112 does not occupy the user's entire field-of-view, if its optical characteristics are not accounted for, this will cause a non-uniformity in optical characteristics where some of the user's field-of-view will be darker than others. Embodiments of the present technology, described below in more detail below, can be used to maintain substantially uniform optical characteristics, including a substantially uniform transmittance, across substantially the entire field-of-view of a user wearing the head mounted display device 102.

Figure 2:
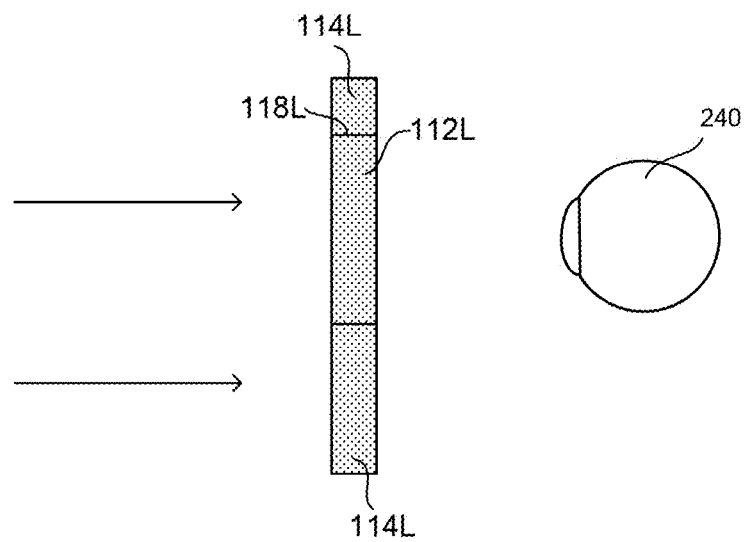
FIG. 2 illustrates a cross-section of the see-through, near-eye mixed reality head mounted display device introduced in FIG. 1 along line B-B in FIG. 1, according to an embodiment.

FIG. 2 illustrates a cross-section of the head mounted display device 102 along line B-B in FIG. 1, according to an embodiment. In this embodiment, the left see-through display region 112L is located within the left window 118L of the see-through transmittance compensation mask 114, such that outer and inner surfaces of the left see-through display region 112L are, respectively, substantially continuous with outer and inner surfaces of the see-through dimming mask 114. Although not shown in FIG. 2, in this embodiment the right see-through display region 112R is similarly located within the right window 118R of the see-through transmittance compensation mask 114, such that outer and inner surfaces of the right see-through display region 112R are, respectively, substantially continuous with outer and inner surfaces of the see-through dimming mask 114.

FIG. 2 also illustrates a user's left eye 240, to show that ambient light, represented by arrows at the left, will travel through the left see-through display region 112L or the see-through transmittance compensation mask 114 before being incident on the user's left eye 240, thereby reducing the brightness of such light. In this embodiment, the transmittance of the see-through transmittance compensation mask 114 is substantially the same as the transmittance of the left and right see-through display regions 112L, 112R to thereby provide a substantially uniform transmittance across substantially the entire field-of-view of a user wearing the head mounted display device 102. For example, if the left and right see-through display regions 112L, 112R have a transmittance of 50 percent, then the see-through transmittance compensation mask 114 also has a transmittance of 50 percent.

In an embodiment, the see-through display region 112 has a static transmittance. In such a case, the see-through transmittance compensation mask 114 can be a passive element having a static transmittance that is substantially equal to the static transmittance of the see-through display region 112. The see-through transmittance compensation mask 114 can be made of glass, plastic or some other transparent material. Such a transparent material can be coated with a tinted film or mirror coated film that provides the see-through transmittance compensation mask 114 with its desired optical characteristics, e.g., a transmittance that is substantially the same as the transmittance of the see-through display region 112. Alternatively, the transparent material from which the see-through transmittance compensation mask 114 is made can provide for the desired optical characteristics (e.g., a desired transmittance) without being coated with a tinted film or mirror coated film.

Figure 3:
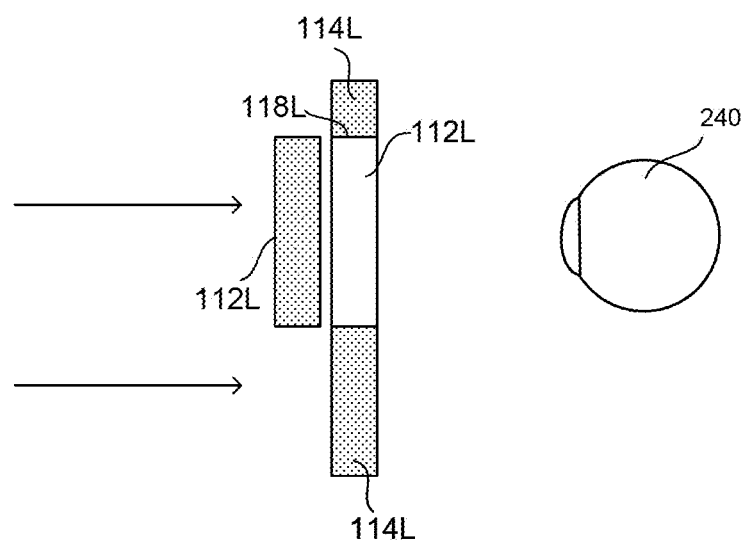
FIG. 3 illustrates a cross-section of the see-through, near-eye mixed reality head mounted display device introduced in FIG. 1 along line B-B in FIG. 1, according to an alternative embodiment.

FIG. 3 illustrates a cross-section of the head mounted display device 102 along line B-B in FIG. 1, in an embodiment where surfaces of the display region 112 are not continuous with surfaces of the see-through transmittance compensation mask 114. In other words, the display region 112 is not coplanar with the see-through transmittance compensation mask 114. Preferably, a user's eyes are centered relative to the windows 118L, 118R of the see-through transmittance compensation mask 114 (i.e., the left eye is centered relative to the left window 118L and the right eye is centered relative to the right window 118R). However, because different people have different facial features, noses, interpupillary distances (IPDs), and the like, this preferred condition is not always easy to achieve. Further, each different time a same person wears the head mounted display device 102 or adjusts the head mounted display device 102 the relatively locations of that person's eyes to the windows 118 may change.

Still referring to FIG. 3, assume that the left window 118L is the same size as the left display region 112L, and the right window 118R is the same size of the right display region 118R, which is the case in certain embodiments. When a user's left and right eyes are centered relative to the left and right windows 118L, 118R in the see-through transmittance compensation mask 114 (i.e., the left eye is centered relative to the left window 118L and the right eye is centered relative to the right window 118R), there will be a substantially uniform transmittance across the entire field-of-view of the user wearing the device, so long as the transmittance of the display region 112 and the transmittance of see-through transmittance compensation mask 114 are substantially the same. However, if the user's eyes are not centered relative to the windows 118 in the see-through transmittance compensation mask 114 (i.e., the left eye is not centered relative to the left window 118L and/or the right eye is not centered relative to the right window 118R), then from the user's perspective one or more non-window portions of the see-through transmittance compensation mask 114 will overlap one or more portions of the display region 112, and an opening or gap will appear between one or more further portions of the see-through transmittance compensation mask 114 and one or more further portions of the display region 112. The non-window portions of the see-through transmittance compensation mask 114 and the display region 112 that overlap one another will appear darker than portions that do not overlap. This is because when light travels through two different elements, each having their own transmittance, the collective transmittance of the two elements is equal to a product of the two transmittances multiplied. For example, if the display region 112 has a transmittance of 50 percent, and the non-window portions of the see-through transmittance compensation mask 114 also have a transmittance of 50 percent, than the portions of the display region and non-window portions of the mask that overlap one another will have a transmittance of 25 percent (i.e., 0.50×0.50=0.25). Conversely, an opening or gap between portions of the display region 112 and the see-through transmittance compensation mask 114 will appear brighter to the user due to light essentially leaking between the display region 112 and the see-through transmittance compensation mask 114 without being attenuated by the transmittance of one or both of the display region 112 and the see-through transmittance compensation mask 114. More generally, due to transmittance mismatches one or more regions within a user's field-of-view may appear darker than others and/or one or more regions within the user's field-of-view may appear brighter than others. Certain embodiments, described below, reduce and preferably minimize such transmittance mismatches, or at least make them less noticeable to a user.

Figure 4A:
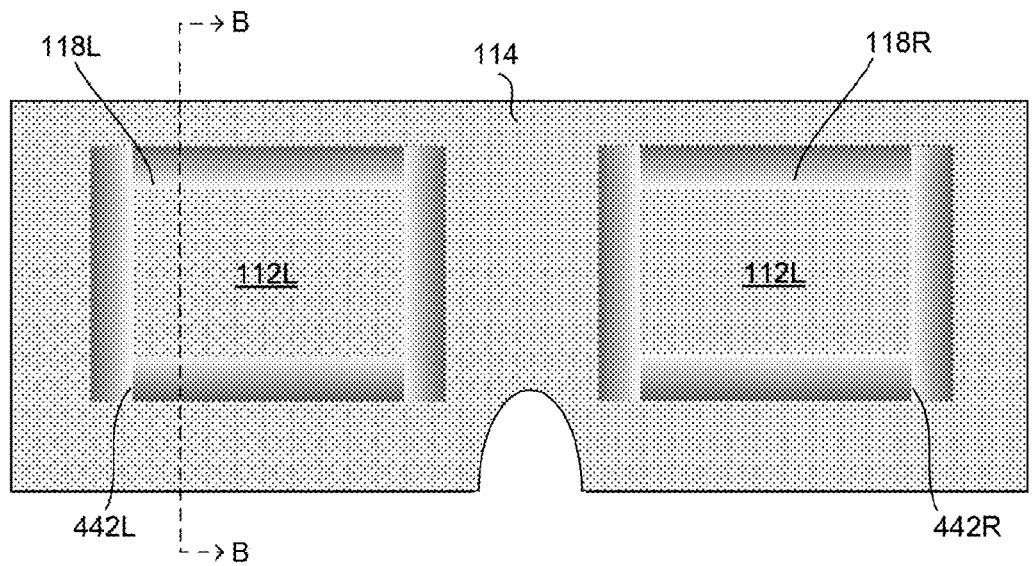
FIG. 4A illustrates a plan view, from the perspective of a user's eyes, of a portion of the see-through, near-eye mixed reality head mounted display device introduced in FIG. 1, according to another embodiment.
Figure 4B:
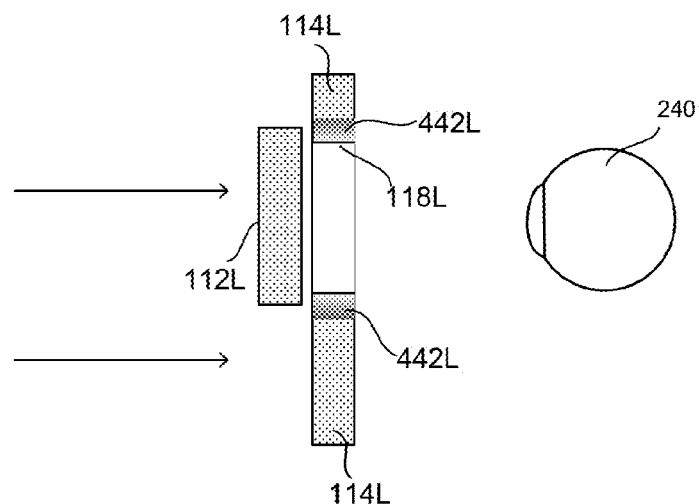
FIG. 4B is a cross-section of the components shown in FIG. 4A along line B-B in FIG. 4A.

FIG. 4A illustrates a plan view, from the perspective of the user's eyes, of a portion of a head mounted display device according to another embodiment. Shown in FIG. 4A is a portion of the see-through transmittance compensation mask 114, with the left display region 112L and the right display region 112R in a plane offset from (e.g., behind) the see-through transmittance compensation mask 114. In other words, in this embodiment surfaces of the display region 112 are not continuous with surfaces of the see-through transmittance compensation mask 114, as was also the case in the embodiment described with reference to FIG. 3. FIG. 4B is a cross-section of FIG. 4A, along line B-B in FIG. 4A. The embodiment described with reference to FIGS. 4A and 4B is similar to the embodiment described with reference to FIG. 3, except the see-through transmittance compensation mask 114 also includes a left border region 442L and a right border region 442R, and the size of the left and right windows 118L, 118R are reduced to accommodate the border regions 442L, 442R. The left border region 44L frames (i.e., surrounds) the left window 118L and overlaps a portion of the left see-through display region 112L. Similarly, the right border region 442R frames (i.e., surrounds) the right window 118R and overlaps a portion of the right see-through display region 112R. In an embodiment, peripheral portions of the left and right display regions 112L, 112R, which are overlapped by the border regions 442L, 442R, are non-active, meaning virtual images are not displayable in such peripheral portions. In an embodiment, the non-active peripheral portions of the left and right display regions 112L, 112R have the same transmittance as the active portions of the left and right display regions 112L, 112R, wherein virtual images are displayable in the active portions. Alternatively, the entire left and right display regions 112L, 112R can be active.

Still referring to FIGS. 4A and 4B, the left and right border regions 442L, 442R of the see-through transmittance compensation mask 114 each include a gradient pattern that gradually transitions between a first density and a second density, which is less than the first density, as portions of the left and right border regions 442L, 442R get closer, respectively, to the left and right windows 118L, 118R that they surround. The portion of the gradient pattern having the first density preferably achieves or provides a transmittance that is substantially the same of the transmittance of the rest of the see-through transmittance compensation mask 114, exclusive of the windows 118L, 118R. For example, if the rest of the see-through transmittance compensation mask 114 has a transmittance of 50 percent, then the portion of the gradient pattern having the first density preferably achieves or provides a transmittance of 50 percent. The portion of the gradient pattern having the second density preferably achieves or provides a transmittance that is substantially the same of the transmittance of the windows 118L, 118R. For example, assume that the windows 118L, 118R have a transmittance of 100 percent. In this example, the gradient pattern preferably gradually transitions between a first density, that provides a transmittance of 50 percent, and a second density, that provides a transmittance of 100 percent, with densities of the gradient pattern therebetween gradually transitioning from providing a transmittance of 50 percent to providing a transmittance of 100 percent.

In accordance with an embodiment, the gradient pattern is printed on the inner and/or outer surfaces of portions of the see-through transmittance compensation mask 114 that corresponds to the left and right border regions 442L, 442R. The gradient pattern can be made up of dots, squares or other shapes that vary in size and/or quantity to very their density, and more specifically, vary the transmittance of the left and right border regions 442L, 442R. Other techniques for achieving or providing gradient patterns are also possible and within the scope of an embodiment. In accordance with an embodiment, the gradient pattern of each border region 442L, 442R is a static pattern that does not change. The border regions 442L, 442R having the gradient pattern make the aforementioned transmittance mismatches, described with reference to FIG. 3, less noticeable to a user. In other words, the border regions 442L, 442R having the gradient pattern make a user wearing a head mounted display less susceptible to noticing dark and/or bright regions caused by transmittance mismatches.

As explained above in the discussion of FIG. 3, assuming that the left window 118L is the same size as the left display region 112L and the right window 118R is the same size of the right display region 118R, if a user's eyes are centered relative to the windows 118 (i.e., the left eye is centered relative to the left window 118L and the right eye is centered relative to the right window 118R), then there will be a substantially uniform transmittance across the entire field-of-view of a user wearing the device, so long as the transmittance of the display region 112 and the transmittance of see-through transmittance compensation mask 114 are substantially the same. However, if the user's eyes are not centered relative to the windows 118 (i.e., the left eye is not centered relative to the left window 118L and/or the right eye is not centered relative to the right window 118R), then from the user's perspective one or more non-window portions of the see-through transmittance compensation mask 114 will overlap one or more portions of the display region 112, and/or an opening or gap will appear between one or more further portions of the see-through transmittance compensation mask 114 and one or more further portions of the display region 112. As explained above, this can result in non-window portions of the see-through transmittance compensation mask 114 and the display region 112 that overlap one another appearing darker than portions that do not overlap, and other portions appearing brighter where light leaks through openings or gaps between portions of the display region 112 and the non-window portions of see-through transmittance compensation mask 114.

In accordance with certain embodiments, initially described with reference to FIG. 5A, a left border region 542L of the see-through transmittance compensation mask 114 includes features 544 that are individually selectively activated to adjust boundaries of the left window 118L and thereby adjust a position of the left window 118L. While not shown in FIG. 5A, there is similarly a right border region 542R of the see-through transmittance compensation mask that includes a plurality of features that are individually selectively activated to adjust boundaries of the right window 118R and thereby adjust a position of the right window 118R. The left and right border regions 542L and 542R can collectively be referred to as border regions 542, and can individually be referred to as a border region 542.

Figure 5A:
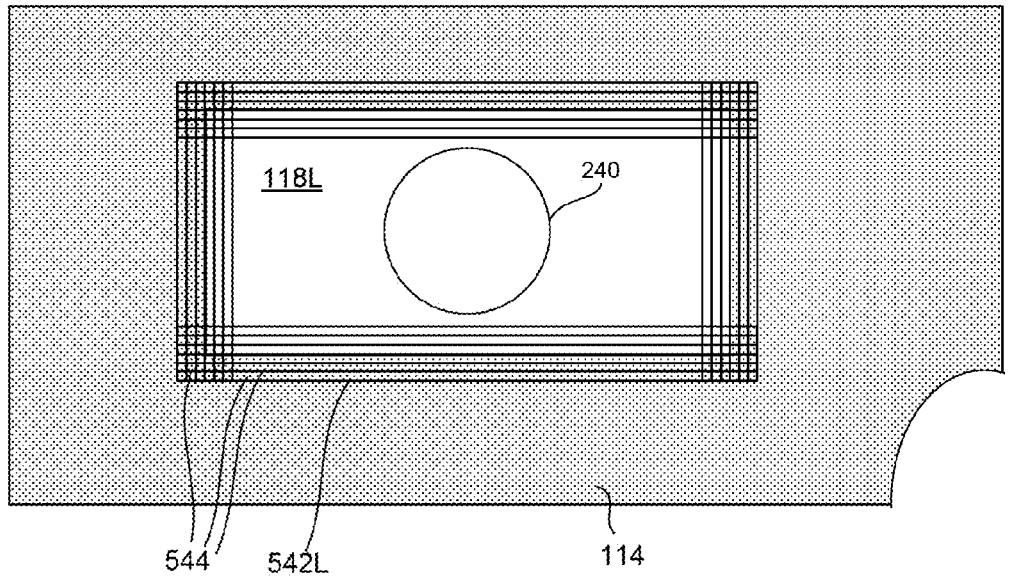
FIGS. 5A and 5B illustrate portions of a left side of a see-through, near-eye mixed reality head mounted display device, according to an embodiment where features of border regions of a see-through transmittance compensation mask are selectively activated.

In the embodiment shown in FIG. 5A, the selectively activated features 544 of each of the border regions 542 include six upper horizontally arranged rectangular features 544, six lower horizontally arranged rectangular features 544, six left vertically arranged rectangular features 544, six right vertically arranged rectangular features 544, and thirty-six square features 544 in each of four corners. This is just an example of the shapes, numbers and arrangement of selectively activated features 544 that can be included within each border region 542. Other shapes, numbers and arrangements of selectively activated features 544 are also possible and within the scope of the embodiments described herein. For example, the border region 542 can includes rows and columns of square or circular shaped selectively activated features 544.

Each selectively activated feature 944 of the border region 542 can be, for example, a liquid crystal (LC) element or pixel, a polymer dispersed liquid crystal (PDLC) element or pixel, or an electrochromic (EC) element or pixel, but are not limited thereto. In such embodiments, the features can be selectively activated by application of an appropriate voltage. Preferably, when not activated the features have a high transmittance (e.g., as close to 100 percent as possible), and when activated the features have a transmittance (e.g., 50 percent) that is substantially the same as the rest of the see-through transmittance compensation mask 114 and the display region 112 (not specifically shown in FIG. 5A).

In accordance with an embodiment, a controller (e.g., 932 in FIG. 9) selectively activates individual ones of the features 544 of the left and right border regions 542L, 542R to thereby position the left and right windows 118L, 118R such that the user's left eye is centered relative to left window 118L and the user's right eye is centered relative to right window 118R. More specifically, the controller selectively adjusts the transmittances of portions of the border regions 542 so that the users' left and right eyes are effectively centered relative to left and right windows 118L, 118R. In other words, adjusting which features 544 of the border regions 542 that are activated and not activated enables position of the windows 118 to be moved so as to center the user's eyes relative to windows 118. One or more eye tracking camera (e.g., 934B in FIG. 9) can be used to determine the locations of the user's left and right eyes, and the controller can determine how to selectively activate the features 544 to center the user's left and right eyes with respect to the left and right windows 118L, 118R based on the positions of the user's left and right eyes as determined using the eye tracking camera(s).

Figure 5B:
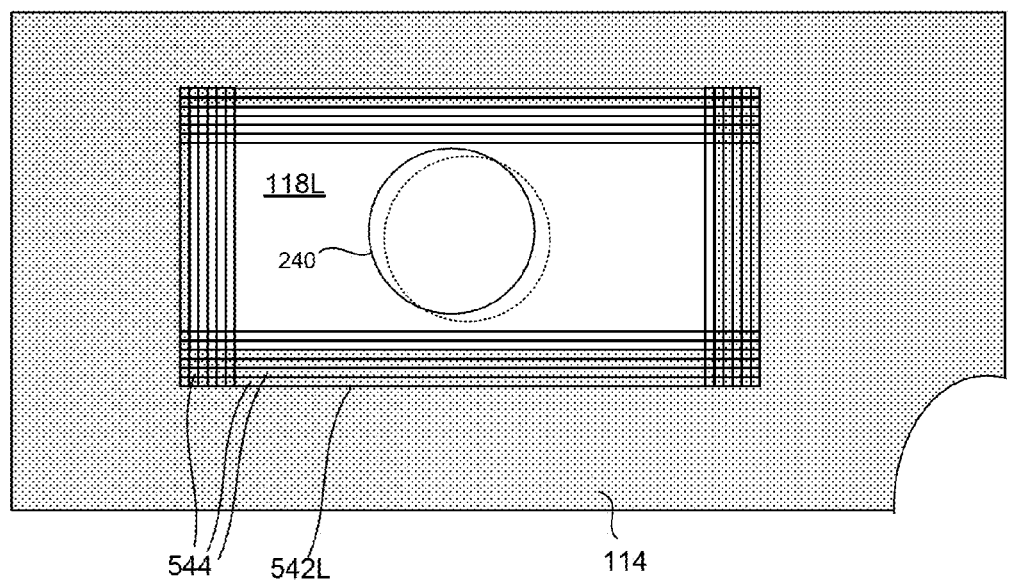

In FIG. 5A, the features 544 are shown as being selectively activated in equal numbers on each of the four sides of the left border region 542L to thereby center the user's left eye 240 relative to left window 118L. When a user's left eye is in different horizontal and/or vertical positions, and thus a different location as shown in FIG. 5B, the individual ones of the features 544 that are selectively activated changes to again center the user's left eye relative to left window 118L. A comparison between FIGS. 5B and 5A shows that in FIG. 5B more features 544 on the lower and right sides are activated, and less features 544 on the upper and left sides are activated. The dashed circle in FIG. 5B illustrates the position of the eye 240 in FIG. 5A, and thus, illustrates how eye positions are different in FIGS. 5A and 5B.

In accordance with another embodiment, described with reference to FIGS. 6A and 6B, rather than just having border regions that include features can be selectively activated by application of an appropriate voltage, substantially the entire see-through transmittance compensation mask 114 is made up of such features. For example, substantially the entire see-through transmittance compensation mask 114 can include LC, PDLC or EC elements or pixels that can be selectively activated by application of an appropriate voltage. Uses of other types of technology are also possible. When not activated these elements or pixels can have a high transmittance (e.g., as close to 100 percent as possible), and when activated can have a lower transmittance (e.g., 50 percent) that is substantially the same as the display region 112. In this embodiment, a majority of the area of the see-through transmittance compensation mask 114 can be made up of rows and columns of square, circular or other shaped selectively activated features (e.g., pixels). Circuitry that is similar to what is used in row and column drivers of LC displays and other types of displays can be used to selectively activate individual features of such a see-through transmittance compensation mask 114. This embodiment provides the advantage of enabling the transmittance of substantially the entire see-through transmittance compensation mask 114 to be adjustable, which would be especially useful where the transmittance of the display region 112 is adjustable. Additionally, this enables the individual ones of the features to be selectively activated to thereby position the left and right windows 118L, 118R such that the user's left eye is centered relative to left window 118L and the user's right eye is centered relative to right window 118R. In other words, in a similar manner as was described above with reference to FIGS. 5A and 5B, this embodiment enables a controller to adjust which features 644 of the of the see-through transmittance compensation mask 114 that are activated and not activated to move the positions of the left and right windows 118L, 118R so that the user's left and right eyes are centered relative to left and right windows 118L, 118R.

Figure 6A:
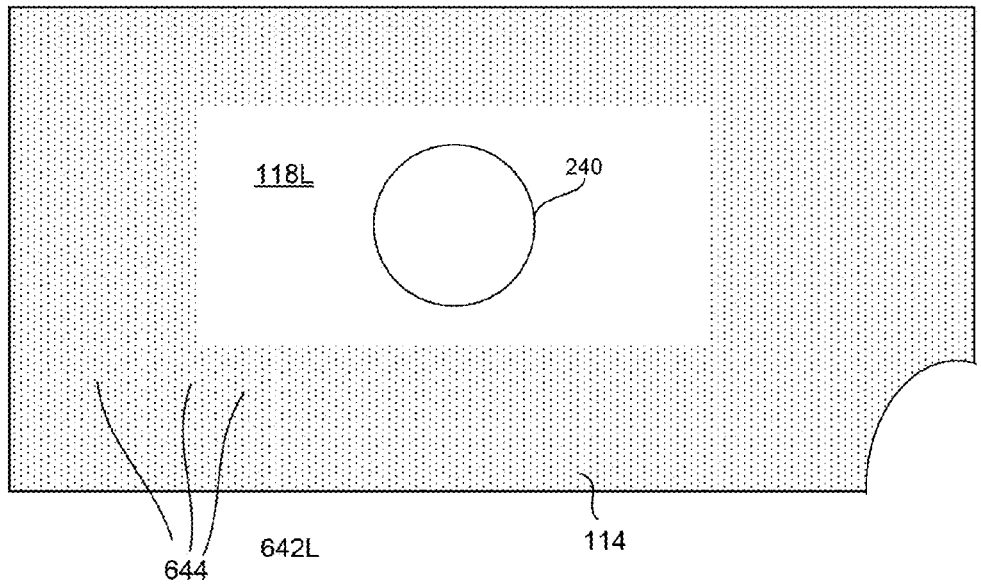
FIGS. 6A and 6B illustrate portions of a left side of a see-through, near-eye mixed reality head mounted display device, according to another embodiment where features of a majority of a see-through transmittance compensation mask are selectively activated.
Figure 6B:
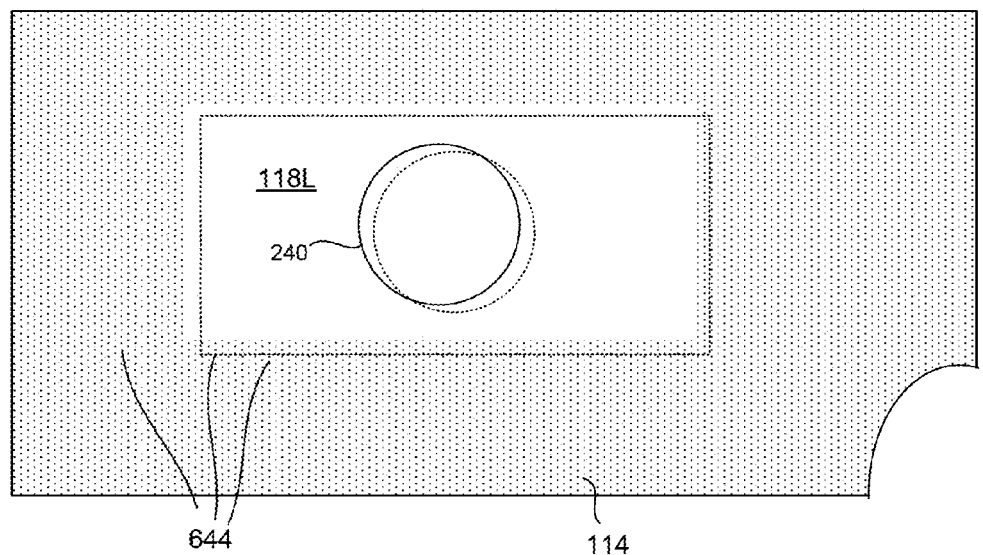

Referring to FIG. 6A, the see-through transmittance compensation mask 114 is shown as including selectively activated features 644, which are shown as small dots. In FIG. 6A, the features 644 are selectively activated to position the left window 118L so that the user's left eye 240 is centered relative to left window 118L. FIG. 6B shows the user's left eye in a different position. The dashed circle in FIG. 6B illustrating the position of the eye 240 in FIG. 6A, and thus, illustrating how eye positions are different in FIGS. 6A and 6B. The dashed rectangle in FIG. 6B illustrates the position of the left window 118L in FIG. 6A, and thus, illustrates how the position of the left window 118L is changed so as to center the user's left eye relative to left window 118L (when the position of the user's left eye changes). While not specifically shown in FIGS. 6A and 6B, features 644 are also similarly selectively activated to position the right window 118R so that the user's right eye is centered relative to right window 118R.

Figure 7:
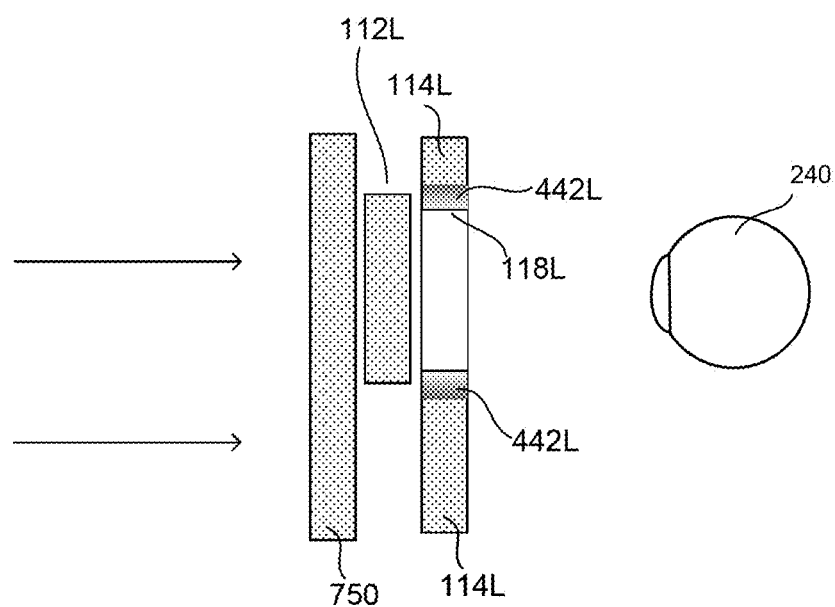
FIG. 7 illustrates a cross-section of the see-through, near-eye mixed reality head mounted display device introduced in FIG. 1 along line B-B in FIG. 1, according to still another embodiment.

In accordance with further embodiments, a see-through dimming panel can be added to any one of the above described embodiments. For example, FIG. 7 illustrates a see-through dimming panel 750 added to the embodiment previously described with reference to FIGS. 4A and 4B. The see-through dimming panel 750 overlaps both the see-through display regions 112L, 112R and see-through transmittance compensation mask 114. The see-through dimming panel 750, which can be made of glass, plastic or some other transparent material, can have a static transmittance achieved, e.g., by being coated with a tinted film or mirror coated film. Alternatively, the see-through dimming panel 750 has a transmittance (and/or one or more other optical characteristics) that changes. The transmittance (and/or one or more other optical characteristics) of the see-through dimming panel 750 may change, e.g., in response to user inputs, in response to signals from the control circuitry 136 and/or in response to signals from the light sensor 108, but is not limited thereto. For example, a user may be able to change the transmittance (and/or other optical characteristics) of the see-through dimming panel 750 using one or more buttons, a slider or some other tactile user interface (e.g., 943 in FIG. 9) located on the frame 115 of the head mounted display device 102 or using a user interface on a mobile computing device (e.g., a smartphone or tablet) that communicates with the head mounted display device 102.

While transmittance is the optical characteristic most often discussed herein, it is also within the scope of an embodiment that other optical characteristics (besides or in addition to transmittance) of the see-through dimming panel 750 (and other see-through elements discussed herein) can be dynamically controlled. Examples of such other optical characteristics include, but are not limited to, spectral profile and color shift properties. Various different technologies can be used to provide a see-through dimming panel 750 that has a transmittance that can be changed, and more generally, that has one or more optical characteristics that can be changed. For example, the see-through dimming panel 750 can be or include an electrochromic (EC) element having a transmittance that changes in response to changes in an applied voltage, and thus, allows control over the amount of ambient visible light that passes through the dimming panel.

In another embodiment, the see-through dimming panel 750 can be or include a suspended particle device (SPD) element. Such an SPD element can, e.g., be implemented as a thin film laminate of rod-like nano-scale particles suspended in a liquid between two pieces of glass or plastic. When no voltage is applied to the SPD element, the suspended particles are randomly organized which results in the particles blocking light, and thus, causes a low transmittance. When a voltage is applied, the suspended particles align and let light pass therethrough, thereby increasing the transmittance. Varying the voltage applied to the SPD element varies the orientation of the suspended particles, thereby changing the transmittance.

In still other embodiments, the see-through dimming panel 750 can be or include a liquid crystal (LC) element or a polymer dispersed liquid crystal (PDLC) element. A PDLC element can be produced, e.g., by dispersing liquid crystals in a liquid polymer placed between two layers of transparent glass or plastic and then solidifying or curing the liquid polymer, which results in droplets throughout the solid polymer. When no voltage is applied to transparent electrodes of the PDLC element, the liquid crystals are randomly arranged in the droplets, which resulting in scattering of light as it passes through the PDLC element. However, when a voltage is applied to the electrodes, an electric field formed between the two transparent electrodes causes the liquid crystals to align, which allows light to pass through the droplets with less scattering. The transmittance of a PDLC element can thereby be controlled by varying the applied voltage.

There are many types of liquid crystal (LC) technologies that enable electronic control of light transmission, such as Twisted-Nematic (TN) and Guest-Host (GH) types. Some LC technologies utilizes polarizers (e.g., TN type), where incoming light is polarized into a certain direction, and output through another polarizer after traversing a liquid crystal layer, which may or may not rotate the light's polarization depending on the electronic control. The rotation of the light polarization leads to change in light transmission off the second polarizer. In non-polarizer types, the individual liquid crystal molecules can be mixed with dye molecules that change light transmission depending on the presence or absence of an electric field, which may be controlled by an electronic driver.

In an embodiment, the see-through dimming panel 750 can be or include a photonic crystal element, a photochromic element or a thermochromic. Photonic crystal technology is an extension of the liquid crystal technology, where certain periodicity in structure leads to the formation of a photonic crystal, which allows control of light transmission as a function of frequencies (essentially a photonic bandgap similar to semiconductor bandgap effects). This allows large dynamic range control of light, e.g., <0.1% transmission, to >99% transmission of light, or half-way 50% transmission. The non-transmitted light energy is reflected off the panel.

Photochromic technology relies on photo-assisted processes (typically it requires illumination by UV light, or visible light in more recent technologies), where dyes/compounds undergo reversible photochemical reaction, which changes the transmission of visible light. This is typically not electronically controlled, rather it is controlled by the intensity of illuminating light. This is the technology used in switchable sunglasses that turns dark when exposed to sunlight (UV-rich source). Thermochromic technology is similar to photochromic, except it is induced by temperature/thermal energy instead of illuminating light, to change visible light transmission. It is typically not electronically controlled.

In another embodiment, the see-through dimming panel 750 can be or include a MEMS micro-blinds element that controls the amount of light that passes through the panel in response to an applied voltage. Such micro-blinds can, e.g., include rolled thin metal blinds on a glass or plastic substrate, where the blinds are so small that they are practically invisible to the human eye. With no applied voltage, the micro-blinds remain rolled and let light pass therethrough, thereby achieving a relatively high transmittance. However, when a voltage is applied to provide a potential difference between the rolled metal layer and a transparent conductive layer, an electric field is formed that causes the rolled micro-blinds to stretch out and thus block light, which reduces the transmittance of the panel. Thus, by varying the applied voltage, the transmittance of the MEMS micro-blinds element can be changed. It is also possible that other types of technologies, besides those listed herein, can be used to provide a see-through dimming panel 750 that has a transmittance and/or one or more other optical characteristics that can be changed, either by a user, and/or through use of feedback, e.g., from the light sensors described herein.

In accordance with certain embodiments, the see-through dimming panel 750 is an active dimming panel having a transmittance that is adjusted in dependence on ambient visible light that is incident on the light sensor 108 shown in and discussed with reference to FIG. 1. More specifically, the light sensor 108 can detect ambient visible light that is incident on the sensor and in response thereto can produce one or more signals indicative of one or more characteristics (e.g., intensity) of the detected ambient visible light. The one or more signals produced by the light sensor 108 can be provided to the control circuitry 136 and/or the processing unit 104, at least one of which can adjust the transmittance of the see-through dimming panel 750 in dependence on at least one of the one or more signals produced by the light sensor 108. Such an embodiment can be used, e.g., to maintain a substantially constant brightness for the user as ambient light levels change. For example, assume that when ambient light levels are relatively high, the transmittance of the see-through dimming panel 750 is relatively low. When ambient light levels decrease, the transmittance of the see-through dimming panel 750 can be increased in an attempt keep the amount of ambient light that reaches the user's eyes relatively static, or to at least reduce the extent of the fluctuations in ambient light levels that reach the user's eyes.

In addition to, or instead of, using the light sensor 108 (shown in FIG. 1) to detect characteristics of ambient light that is incident on an outer portion of the head mounted display device 102, the light sensor 113 (shown in FIG. 1) can be used to detect characteristics (e.g., intensity and/or color content) of light that has traveled through both the see-through dimming panel 750 and the see-through display region 112, and the light sensor 116 (shown in FIG. 1) can be used to detect characteristics (e.g., intensity and/or color content) of light that has traveled through both the see-through dimming panel 750 and the see-through transmittance compensation mask 114. Each of the light sensors 113 and 116 can produce one or more signals indicative of one or more characteristics (e.g., intensity and/or color content) of the light detected by the respective sensor. Such signals produced by the light sensors 113 and 116 can be provided to the control circuitry 136 and/or the processing unit 104, at least one of which can adjust the transmittance (and/or other optical characteristics) of the see-through dimming panel 750. The positions and number of light sensors can be different than shown in the FIGS.

In accordance with certain embodiments, the see-through dimming panel 750 can be used to control a see-through contrast ratio (STCR) associated with the portion of the device 102 that includes the see-through display region 112. For example, the see-through dimming panel 750 can be used to allow a user to adjust the STCR, or to maintain a substantially constant STCR. For the portion of the device 102 that includes the see-through display region 112, the see-through contrast ratio (STCR) refers to the ratio of the total brightness of visible light emanating from the viewing side of the of the device 102 (which includes visible light emitted by the see-through display region 112 plus ambient visible light that passes through both the dimming panel 750 and the see-through display region 112) over the brightness of the ambient visible light emanating from the viewing side of the of the device 102 (which includes the brightness of the ambient visible light that passes through both the dimming panel 750 and the see-through display region 112). The viewing side of a device refers to the side that faces a user of the device, and more specifically, the side of the device 102 that faces the user's eyes. Where the brightness of the see-through display region 112 is adjustable, the STCR can additionally, or alternatively, be controlled by adjusting the brightness of the see-through display region 112. In accordance with certain embodiments, the STCR can be determined based on signals received from one or more of the light sensors described herein, the transmittance of the see-through dimming panel 750 and/or the transmittance of see-through display region 112. Signals received from one or more of the light sensors described herein can be used in a closed loop feedback system to maintain a substantially constant STCR. The substantially constant STCR can be a default STCR level, an STCR level specified by a user using a user interface, or an STCR level specified by an application that the device 102 executes. In general, the greater the STCR, the easier it is for a user to view virtual objects displayed by the see-through display region 112.

During or after the assembly of one of the aforementioned embodiments of the head mounted display device 102, calibration and characterization of the resulting collective optical and electro-optical system can be performed. For example, a photometric measurement of controlled light rays through various optical elements (each of which may involve multiple points) can be performed to determine a default optical state of the system, to ensure appropriate selection of optical elements to create a uniform distribution of light intensity (and possibly other optical characteristics as desired) across substantially the entire field-of-view of a user. In addition to selection of optical elements, tuning may be done by electronic control of the active electro-optical elements. Active/dynamic control calibration and characterization can be done by performing time-varied photometric measurements and monitoring of electronic control signals, and performing tuning as required. Such calibration and characterization techniques can be used to ensure that optical properties and transitions are consistent across many optics in an optical path.

Figure 8A:
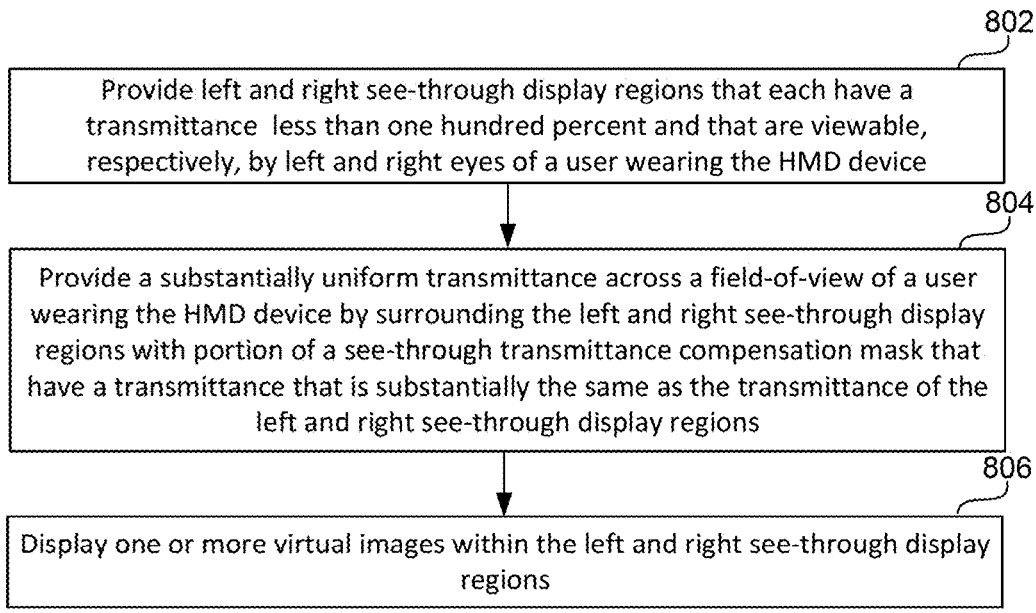
FIGS. 8A and 8B are high level flow diagrams that are used to summarize methods according to various embodiments of the present technology.

The high level flow diagram of FIG. 8A will now be used to summarize a method for use with a user wearable see-through, near-eye mixed reality head mounted display (HMD) device. Referring to FIG. 8A, step 802 involves providing left and right see-through display regions (e.g., 112L, 112R) that each have a transmittance that is less than one hundred percent and that are viewable, respectively, by left and right eyes of a user wearing the HMD device. Step 804 involves providing a substantially uniform transmittance across a field-of-view of a user wearing the HMD device by surrounding the left and right see-through display regions with portions of a see-through transmittance compensation mask (e.g., 114) that have a transmittance that is substantially the same as the transmittance of the left and right see-through display regions. For example, if the left and right see-through display regions have a transmittance of 50 percent, then the transmittance of the see-through transmittance compensation mask (excluding its windows, through which the see-through display regions are visible) will be 50 percent. Step 806 involves displaying one or more virtual images within the left and right see-through display regions.

As explained above, when discussing FIG. 3, from a perspective of a user wearing the HMD device, transmittance mismatches may occur where a non-window portion of the see-through transmittance compensation mask (e.g., 114) overlaps one of the left and right see-through display regions (e.g., 112L, 112R). Transmission mismatches may also occur where ambient light leaks through a gap between the see-through transmittance compensation mask (e.g., 114) and one of the left and right see-through display regions (e.g., 112L, 112R).

As was described above, with reference to FIGS. 4A and 4B, the transmittance mismatches can be made less noticeable to a user wearing the HMD device by including, on one or more portions of the see-through transmittance compensation mask (e.g., 114) where the transmittance mismatches may occur, a gradient pattern that gradually transitions between a first density and a second density less than the first density. Examples of such gradient patterns are shown in, and described with reference to, FIGS. 4A and 4B. A method can involve using such gradient patterns to make transmittance mismatches less noticeable to a user.

The above mentioned transmittance mismatches are reduced and preferably minimized when the user's left and right eyes are centered, respectively, relative to left and right windows (e.g., 118L, 118R) of the see-through transmittance compensation mask (e.g., 114). More specifically, such centering is performed to reduce and preferably minimize instances where, from the user's perspective, a non-window portion of the see-through transmittance compensation mask (e.g., 114) overlaps one of the left and right see-through display regions (e.g., 112L, 112R). Additionally, such centering is performed to reduce and preferably minimize instances where there is a gap between the see-through transmittance compensation mask (e.g., 114) and one of the left and right see-through display regions (e.g., 112L, 112R) through which ambient light may leak. Accordingly, such centering can be used to reduce and preferably minimize areas that appear darker than other, and areas that appear brighter than others. The high level flow diagram of FIG. 8B, discussed below, is used to summarize how such centering can be performed.

Figure 8B:
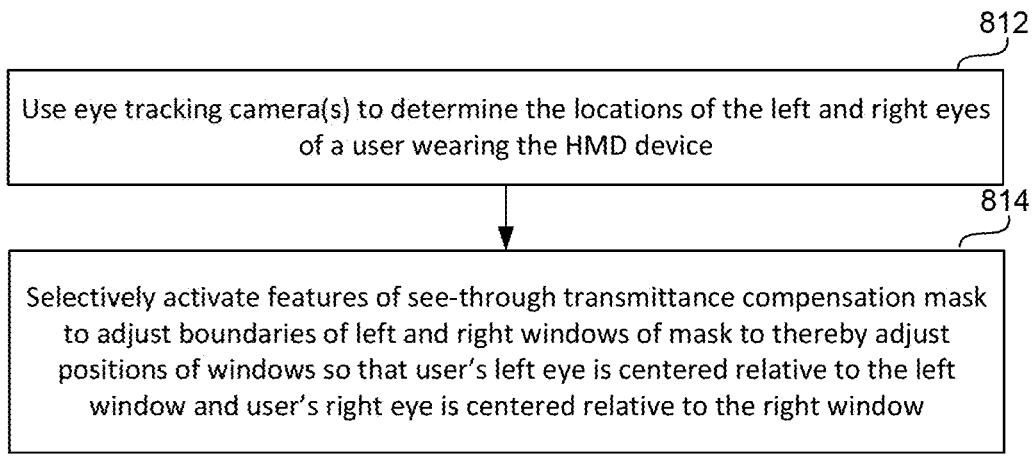

Referring to FIG. 8B, at step 812, one or more eye tracking cameras are used to determine the locations of the left and right eyes of a user wearing the HMD device. At step 814, features (e.g., 544 or 644) of the see-through transmittance compensation mask (e.g., 114) are selectively activated to adjust boundaries of the left and right windows (e.g., 118L, 118R) to thereby adjust positions of the left and right windows. As was explained above, the windows are preferably positioned so that the user's left eye is centered relative to left window (e.g., 118L) and the user's right eye is centered relative to right window (e.g., 118R). Additional details of step 814 can be appreciated from the above discussion of FIGS. 5A, 5B, 6A and 6B.

Figure 9:
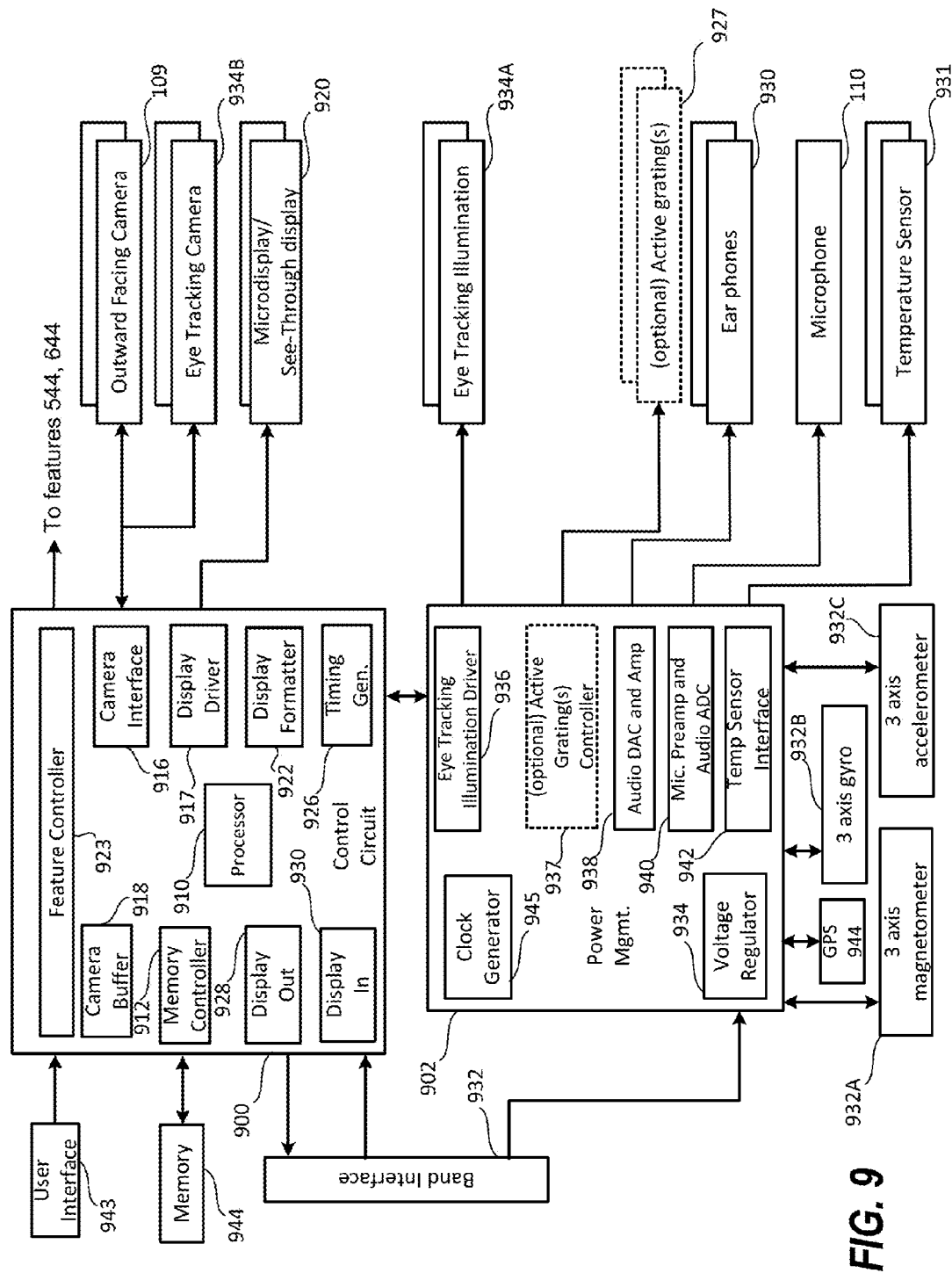
FIG. 9 is a block diagram of one embodiment of hardware and software components of a see-through, near-eye, mixed reality display device as may be used with one or more embodiments.
Figure 10:
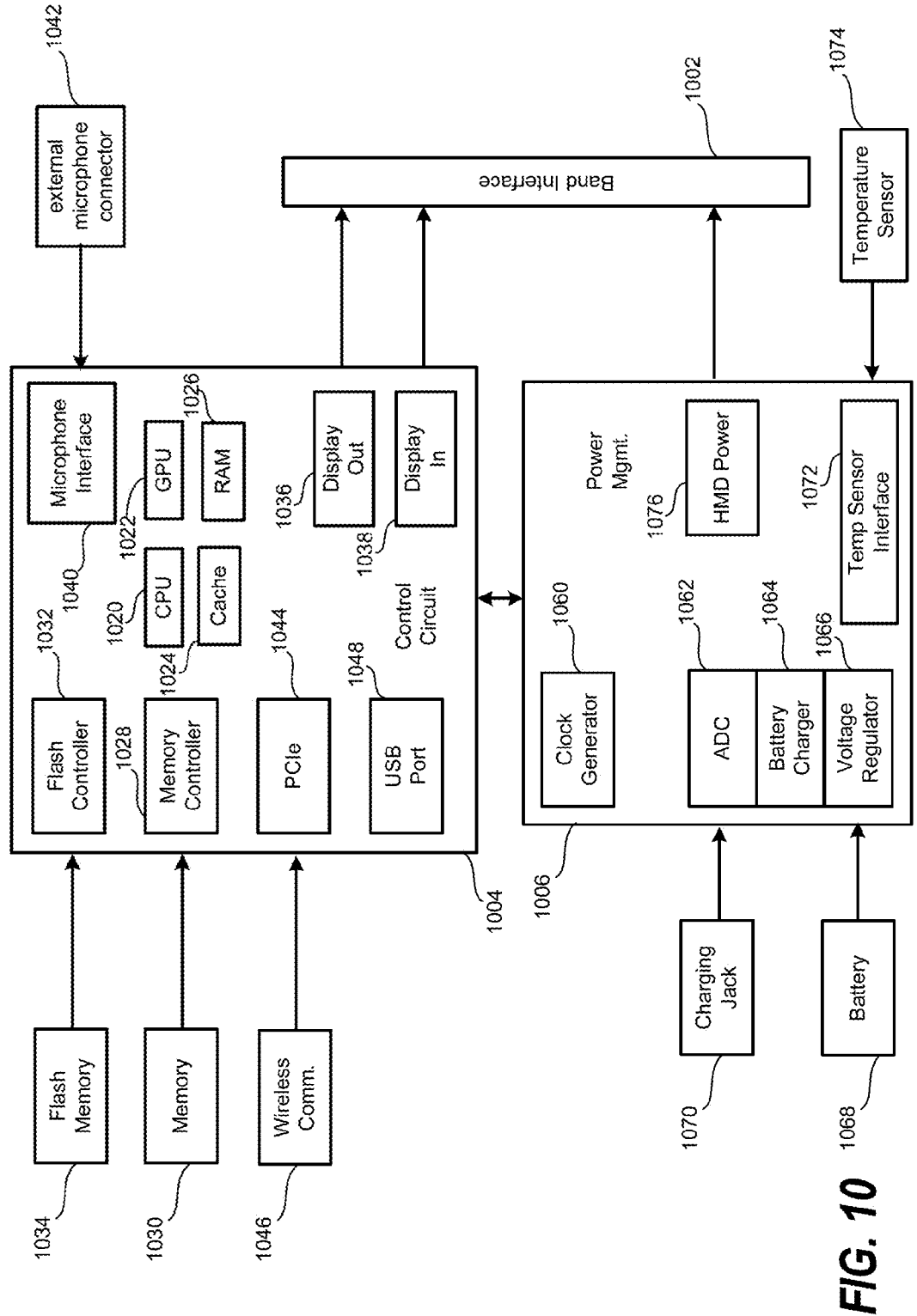
FIG. 10 is a block diagram of one embodiment of hardware and software components a processing unit as may be used with one or more embodiments.

FIG. 9 is a block diagram of one embodiment of hardware and software components of the see-through, near-eye, mixed reality head mounted display device 102 introduced in FIG. 1. FIG. 10 is a block diagram of one embodiment of hardware and software components of the processing unit 104 introduced in FIG. 1. In an embodiment, the head mounted display device 102 receives instructions about a virtual image from the processing unit 104 and provides data from sensors back to the processing unit 104. Software and hardware components that may be embodied in the processing unit 104, for example as depicted in FIG. 10, receive the sensory data from the head mounted display device 102 and may also receive sensory information from the computing system 152 over the network 150. Based on that information, the processing unit 104 can determine where and when to provide a virtual image to the user and send instructions accordingly to the control circuitry 136 of the head mounted display device 102.

Note that some of the components of FIG. 9 are shown in shadow to indicate that there can be at least two of each of those components, e.g., at least one for the left side and at least one for the right side of head mounted display device 102. FIG. 9 shows a control circuit 900 in communication with a power management circuit 902. The control circuit 900 includes a processor 910, memory controller 912 in communication with memory 944 (e.g., D-RAM), a camera interface 916, a camera buffer 918, a display driver 917, a display formatter 922, an optical characteristics controller 923, a timing generator 926, a display out interface 928, and a display in interface 930. In one embodiment, all of the components of the control circuit 900 are in communication with each other via dedicated lines of one or more buses, or using a shared bus. In another embodiment, each of the components of the control circuit 900 is in communication with the processor 910.

Eye tracking cameras 934B can be used to detect eye elements such as a cornea center, a center of eyeball rotation and a pupil center for each eye. Based on such information, and/or other information obtained using the eye tracking cameras 934B, the locations of a user's left and right eyes, including the interpupillary distance between the left and right eyes, can be determined. Additionally, the vertical positions of the left and right eyes relative to the HMD device 102, and relative to one another, can be determined. The processor 910 and/or the processor 104 can determine (e.g., calculate) the locations of the user's left and right eyes based on images and/or other information obtained by the eye tracking cameras 934B.

The camera interface 916 provides an interface to the one or two outwardly facing cameras 109, and in an embodiment, an IR camera as sensor 934B and stores respective images received from the cameras 109, 934B in the camera buffer 918. The display driver 917 can drive a micro-display device or a see-through micro-display 920. Display formatter 922 may provide information, about the virtual image being displayed on micro-display device or see-through micro-display 920 to one or more processors of one or more computer systems, e.g. 104 and/or 152 performing processing for the mixed reality system. Timing generator 926 is used to provide timing data for the system. Display out interface 928 includes a buffer for providing images from outwardly facing camera(s) 109 and the eye tracking cameras 934B to the processing unit 104. Display in interface 930 includes a buffer for receiving images such as a virtual image to be displayed on the micro-display device or see-through micro-display 920, or more generally, in the see-through display region 112. The display out 928 and the display in 930 communicate with the band interface 932, which is an interface to the processing unit 104.

The feature controller 923 selectively activates individual ones of the features 544 or 644 in dependence on the detected locations of the left and right eyes of the user wearing the HMD device, to thereby position the left and right windows 118L, 118R such that the user's left eye is centered relative to left window and the user's right eye is centered relative to right window. The feature controller 923 can do this by selectively applying voltages to the feature 544 and 644, wherein such features can be LC, PDLC or EC features, but are not limited thereto. Accordingly, the feature controller 923 can implement certain steps of the method described above with reference to FIG. 8B, and described in additional detail above with reference to FIGS. 5A, 5B, 6A and 6B.

A user interface 943 can accept inputs from a user to enable the user to adjust the transmittance (and/or other optical characteristics) of the see-through dimming panel 750 described herein. In certain embodiments, where both the see-through display regions 112 and the see-through transmittance compensation mask 114 have adjustable transmittances, the user interface can also be used to adjust the transmittances of these elements to keep them substantially the same. More generally, the user interface 943 enables a user to adjust optical characteristics of the see-through portions of the head mounted display device 102. To allow for such adjustments, the user interface 943 can include one or more buttons, sliders or some other tactile user interfaces located on the frame 115 of the head mounted display device 102. Alternatively, the user interface 943 can be provided by a mobile computing device (e.g., a smartphone or tablet) or the processing unit 104 that communicates with the head mounted display device 102. The optical characteristics controller 923 and/or the user interface 943 can also be used to control the STCR.

The power management circuit 902 includes a voltage regulator 934, an eye tracking illumination driver 936, an audio DAC and amplifier 938, a microphone preamplifier and audio ADC 940, a temperature sensor interface 942, an active filter controller 937, and a clock generator 945. The voltage regulator 934 receives power from the processing unit 104 via the band interface 932 and provides that power to the other components of the head mounted display device 102. The illumination driver 936 controls, for example via a drive current or voltage, the eye tracking illumination unit 934A to operate about a predetermined wavelength or within a wavelength range. The audio DAC and amplifier 938 provides audio data to the earphones 930. The microphone preamplifier and audio ADC 940 provides an interface for the microphone 110. The temperature sensor interface 942 is an interface for the temperature sensor 931. The active filter controller 937 receives data indicating one or more wavelengths for which each wavelength selective filter 927 is to act as a selective wavelength filter. The power management unit 902 also provides power and receives data back from the three axis magnetometer 932A, three axis gyroscope 932B and three axis accelerometer 932C. The power management unit 902 also provides power and receives data back from and sends data to the GPS transceiver 944.

FIG. 10 is a block diagram of one embodiment of the hardware and software components of the processing unit 104 associated with the see-through, near-eye, mixed reality head mounted display device 102. FIG. 10 shows a control circuit 1004 in communication with a power management circuit 1006. The control circuit 1004 includes a central processing unit (CPU) 1020, a graphics processing unit (GPU) 1022, a cache 1024, RAM 1026, a memory control 1028 in communication with memory 1030 (e.g., D-RAM), a flash memory controller 1032 in communication with flash memory 1034 (or other type of non-volatile storage), a display out buffer 1036 in communication with the see-through, near-eye head mounted display device 102 via a band interface 1002 and the band interface 932, a display in buffer 1038 in communication with the near-eye head mounted display device 102 via the band interface 1002 and the band interface 932, a microphone interface 1040 in communication with an external microphone connector 1042 for connecting to a microphone, a PCI express interface for connecting to a wireless communication device 1046, and USB port(s) 1048.

In one embodiment, the wireless communication component 1046 can include a Wi-Fi enabled communication device, Bluetooth communication device, infrared communication device, cellular, 3G, 4G communication devices, wireless USB (WUSB) communication device, RFID communication device etc. The wireless communication component 1046 thus allows peer-to-peer data transfers with for example, another display device system 100, as well as connection to a larger network via a wireless router or cell tower. The USB port can be used to dock the processing unit 104 to another display device system 100. Additionally, the processing unit 104 can dock to another computing system 152 in order to load data or software onto the processing unit 104 as well as charge the processing unit 104. In one embodiment, the CPU 1020 and the GPU 1022 are the main workhorses for determining where, when and how to insert virtual images into the view of the user, and more specifically, into the see-through display region 112.

The power management circuit 1006 includes a clock generator 1060, an analog-to-digital converter (ADC) 1062, a battery charger 1064, a voltage regulator 1066, a head mounted display (HMD) power source 1076, and a temperature sensor interface 1072 in communication with a temperature sensor 1074 (e.g., located on a wrist band for the processing unit 104). The ADC 1062 is connected to a charging jack 1070 for receiving an AC supply and creating a DC supply for the system. The voltage regulator 1066 is in communication with a battery 1068 for supplying power to the system. The battery charger 1064 is used to charge the battery 1068 (via the voltage regulator 1066) upon receiving power from the charging jack 1070. In an embodiment, the HMD power source 1076 provides power to the head mounted display device 102.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology. For example, it would be possible to combine or separate some of the steps shown in FIGS. 8A and 8B. For another example, it is possible to change the boundaries of some of the blocks shown in FIGS. 9 and 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A see-through, near-eye mixed reality head mounted display (HMD) device configured to be worn by a user, comprising:

left and right see-through display regions each having a transmittance that is less than one hundred percent, the left and right see-through display regions surrounded by portions of a see-through transmittance compensation mask that are not coplanar with the left and right see-through display regions;

the see-through transmittance compensation mask having a left window through which the left see-through display region is visible and a right window through which the right see-through display region is visible, the portions of the see-through transmittance compensation mask surrounding the left and right see-through display regions and not coplanar with the left and right see-through display regions having a plurality of features that are individually selectively activated to adjust boundaries of the left window and thereby adjust positions of the left and right windows;

one or more eye tracking cameras used to detect locations of left and right eyes of the user wearing the HMD device; and a controller that selectively activates individual ones of the features of the portions of the see-through transmittance compensation mask surrounding the left and right see-through display regions, in dependence on the detected locations of the left and right eyes of the user wearing the HMD device, to thereby position the left and right windows of the see-through transmittance compensation mask such that the user's left eye is centered relative to the left window of the see-through transmittance compensation mask and the user's right eye is centered relative to the right window of the see-through transmittance compensation mask;

wherein the left and right see-through display regions allow the user wearing the HMD device to view real world objects through the left and right see-through display regions while one or more virtual images are displayable within the left and right see-through display regions;

wherein the see-through transmittance compensation mask allows the user wearing the HMD device to view real world objects through portions of the see-through transmittance compensation mask that surround the left and right windows of the see-through transmittance compensation mask while limiting an amount of ambient light that travels through the portions of the see-through transmittance compensation mask that surround the left and right windows, so that a transmittance of the portions of the see-through transmittance compensation mask that surround the left and right windows of the see-through transmittance compensation mask is substantially the same as the transmittance of the left and right see-through display regions;

wherein the left and right see-through display regions and the portions of the see-through transmittance compensation mask that surround the left and right windows are within a field-of-view of the user wearing the HMD device; and wherein, because the transmittance of the portions of the see-through transmittance compensation mask that surround the left and right windows of the see-through transmittance compensation mask is substantially the same as the transmittance of the left and right see-through display regions, the see-through transmittance compensation mask provides a substantially uniform transmittance across the field-of-view of the user wearing the HMD device.

2. The device of claim 1, further comprising:
one or more eye tracking cameras used to detect locations of left and right eyes of the user wearing the HMD device; and
a controller that selectively activates individual ones of the features of the portions of the see-through transmittance compensation mask surrounding the left and right see-through display regions and not coplanar with the left and right see-through display regions, in dependence on the detected locations of the left and right eyes of the user wearing the HMD device, to thereby position the left and right windows such that the user's left eye is centered relative to the left window and the user's right eye is centered relative to the right window.

3. The device of claim 1, wherein the selectively activated features of the portions of the see-through transmittance compensation mask surrounding the left and right see-through display regions each has at least one of a circular shape, a square shape or a rectangular shape.

4. The device of claim 1, wherein the features of the portions of the see-through transmittance compensation mask surrounding the left and right see-through display regions that are selectively activated comprise liquid crystal elements, polymer dispersed liquid crystal elements, or electrochromic elements that are selectively activated by application of a voltage.

5. A method for use with a user wearable see-through, near-eye mixed reality head mounted display (HMD) device, the method comprising:

providing left and right see-through display regions that each have a transmittance that is less than one hundred percent and that are viewable, respectively, by left and right eyes of a user wearing the HMD device, wherein the left and right see-through display regions allow the user wearing the HMD device to view real world objects through the left and right see-through display regions while one or more virtual images are displayable within the left and right see-through display regions;

surrounding the left and right see-through display regions with portions of a see-through transmittance compensation mask that are not coplanar with the left and right see-through display regions and have a plurality of features that are individually selectively activated to adjust boundaries of left and right windows of the see-through transmittance compensation mask through which the left and right see-through display regions are respectively visible and thereby adjust positions of the left and right windows, wherein the see-through transmittance compensation mask allows the user wearing the HMD device to view real world objects through the portions of the see-through transmittance compensation mask that surround the left and right windows while limiting an amount of ambient light that travels through the portions of the see-through transmittance compensation mask that surround the left and right windows, so that a transmittance of the portions of the see-through transmittance compensation mask that surround the left and right windows of the see-through transmittance compensation mask is substantially the same as the transmittance of the left and right see-through display regions;

detecting locations of the left and right eyes of a user wearing the HMD device; and selectively activating individual ones of the features of the portions of the see-through transmittance compensation mask surrounding the left and right see-through display regions, in dependence on the detected locations of the left and right eyes of the user wearing the HMD device, to thereby position the left and right windows of the see-through transmittance compensation mask such that the user's left eye is centered relative to the left window of the see-through transmittance compensation mask and the user's right eye is centered relative to the right window of the see-through transmittance compensation mask; and displaying one or more virtual images within the left and right see-through display regions.

6. The method of claim 5, wherein:
the features that are selectively activated comprise liquid crystal elements, polymer dispersed liquid crystal elements, or electrochromic elements; and
the selectively activating features of the portions of the see-through transmittance compensation mask surrounding the left and right see-through display regions comprises selectively applying a voltage to the features of the portions of the see-through transmittance compensation mask surrounding the left and right see-through display regions.

* * * * *